Figure 1:
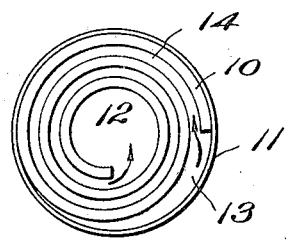

Oct. 30, 1923.

B. B. GOLDSMITH

INK CARTRIDGE

Original Filed May 21, 1919

1,472,063

INVENTOR
Byron B. Goldsmith
BY
H S Mack
ATTORNEY

Patented Oct. 30, 1923.

1,472,063

UNITED STATES PATENT OFFICE.

BYRON B. GOLDSMITH, OF NEW YORK, N. Y.

INK CARTRIDGE.

Application filed May 21, 1919, Serial No. 298,638. Renewed February 20, 1923. Serial No. 580,329.

*To all whom it may concern:*

Be it known that I, BYRON B. GOLDSMITH, a citizen of the United States, residing at New York, in the county of New York and State of New York, have invented certain new and useful Improvements in Ink Cartridges; and I do hereby declare the following to be a full, clear, and exact description of the invention, such as will enable others skilled in the art to which it appertains to make and use the same.

The present invention relates to a new and improved means for producing ink conveniently, rapidly and efficiently. Many different devices have been tried for producing ink by the simple addition of water to the ink-producing materials. These have either been contained in special receptacles, or have been in the form of tablets to be dissolved in water. Of these methods the only one which has survived is the ink tablet, as the former did not produce a suitable ink. The disadvantage of using the ink tablet is readily understood when one considers that to make ink from ink tablets it is necessary to take a measured amount of water for each tablet and place both in a suitable receptacle and agitate until there has been complete solution. In other words, it almost amounts to as much trouble in a small way as the manufacture of liquid ink does on a large scale. The consumer becomes the ink manufacturer. For this reason ink tablets are used very little. The desire to find substitutes for the liquid ink of commerce, arises from three disadvantages it has: Firstly, it is bulky and takes up much space in the factory, on the railroads, and in the dealer's stock. Secondly, it is shipped in glass and there is considerable expense in packing safely, notwithstanding which breakages cannot be avoided. Thirdly, it cannot be shipped in winter as it freezes, ruining the ink or the bottles or both. By the use of my invention it is possible for any unskilled person to produce ink of the finest quality almost instantaneously.

The basic principle of this invention resides in supplying narrow passages for the water wholly or partly lined with ink producing material, which passages are artificially constructed with such a definite relative proportion between their diameter and length that, as the water passes through them, it necessarily has time to take up the required amount of material to produce a satisfactory ink. The use of a single channel would be within this principle of construction, in which case if the channel is wide enough to have the liquid flow rapidly it would have to be long enough to allow the liquid to dissolve sufficient material, or if the channel is narrow the liquid would flow more slowly and the channel need not be so long. It is a little simpler, however, to employ a number of passages.

The general principle underlying this invention is capable of being carried out in a variety of ways, some of which are set forth in certain copending applications for Letters Patent. There is claimed herein that general form or embodiment wherein ink producing material is wound or folded upon itself with percolating channels between the layers. These can be arranged so that the channels run in any direction, and these channels may take a variety of forms. The material may be in a single mass or be in the form of a coating upon a suitable backing. In either case it may be combined with a similarly wound or folded sheet of neutral material.

Figure 2:
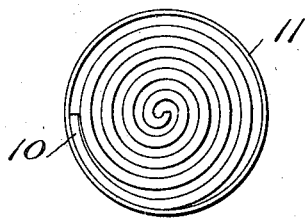
Figure 3:
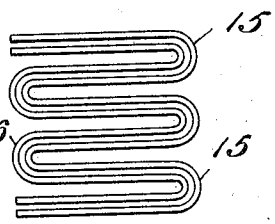
Figure 4:
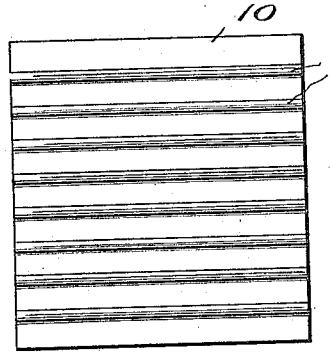
Figure 9:
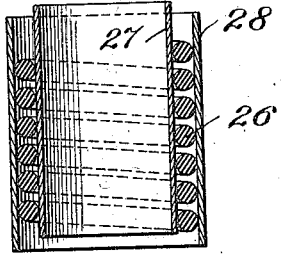
Figure 5:
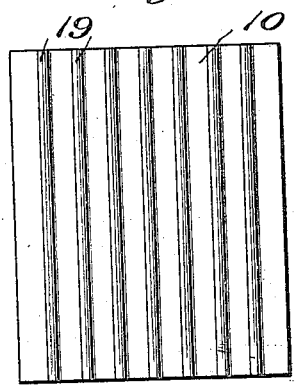
Figure 7:
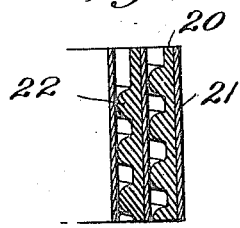
Figure 6:
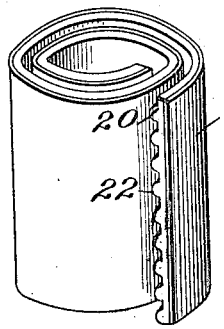
Figure 8:
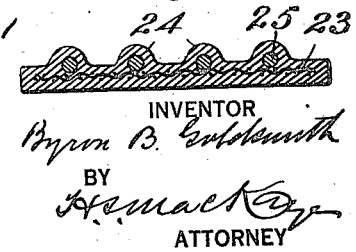

A few of many possible specific embodiments of the invention herein claimed are illustrated in the accompanying drawings, wherein Figures 1 and 2 are plan views of simple spiral arrangements, Figure 3 is a similar view of a return-curve arrangement, Figures 4 and 5 are views in elevation of two forms of ribbed sheets shown unwound, Figure 6 is a perspective view of a composite ribbed sheet as wound for use, Figure 7 is a partial cross sectional view of the form shown in Figure 6, Figure 8 is a cross section of a ribbed sheet having a core of fabric and suitable for use in the manner shown in Figure 6, and Figure 9 is a vertical sectional view of a modification employing an ink-producing body wound in an extended spiral.

It is to be understood that the passages or channels, as formed in the devices actually manufactured, will not be exactly as shown in the drawings. As already stated, the actual diameters and lengths of the passages will be experimentally determined for each particular type of device and character of ink.

In the form shown in Figure 1 the ink-producing body is a simple sheet 10 (viewed edgewise in the figure) and arranged spirally within a casing 11, which may or may not be faced within with ink-producing material. In this form a large opening is left at the center, which will serve as a dipping space for the pen. When water is made to enter the peripheral space 13, it will follow the arrows through the spiral passage 14, and will enter the dipping space 12 in the form of ink. In Figure 2 the spiral sheet 10 is carried inward substantially to the center, and this device is intended to be used by passing a stream of water longitudinally through the spiral percolating channel.

As shown in Figure 3, two sheets 15, 16, may be combined, either or both of which constitutes an ink-producing body; and, in the specific instance illustrated, these are arranged in folds or return curves. They may be supported or fastened in any convenient manner, the drawing being virtually in the nature of a diagram.

Instead of forming percolating passages extending over the entire area of the sheet or sheets, confined passages may be formed. This is preferably accomplished by using ink-producing sheets having ridges or ribs. These may extend longitudinally, as shown at 18 in Figure 4, or transversely as at 19 in Figure 5. In the former case the channels will be spiral and extend inward and horizontally; being best fitted for the arrangement shown in Figure 1. In the latter case the percolating passages will extend longitudinally, and will be used as described above for Figure 2.

One arrangement affording spiral confined passages is shown in perspective in Figures 6 and 7. Here the ink-producing material 20 is supported upon a spiral backing 21, which may or may not contain ink-producing material, and is formed with ridges or ribs 22, limiting the percolating passages. As shown, these ribs are given a definite pitch, so as to form double spirals. This lengthens the resulting percolating passages.

As shown in Figure 8, the ink-producing material may be made by coating or thickly impregnating an inner sheet of fabric 23, and where the ribs 24 are used, their formation may be assisted by the use of longitudinal cords 25, fastened in any well known manner to this backing.

It is not essential to the present invention that the main ink-producing body should have a general sheet-like form. For instance the arrangement shown in Figure 9 may be employed, wherein the ink-producing material takes the form of a long cord 26, supported in an extended spiral wound upon a central support 27, and held in place in any convenient manner, as by the casing 28. In this case the percolating space will also take the form of an extended spiral. In the modification just described the ink-producing body may be conveniently produced by impregnating a cord of cotton or other fabric with ink-producing material.

The term "wound" as used in the claims hereof is intended to cover any of the dispositions of the material herein shown or quivalents thereof; and in claiming "a body" or "a sheet" it is to be understood that I intend to cover devices employing either one or more bodies or sheets, "wound" for the purpose described.

It is clear from the few examples above set forth that the present invention is capable of many modifications, and that its scope is not to be limited to the details herein shown and described.

What is claimed is—

1. An ink cartridge comprising a body wound so as to form a sinuous percolating passage between contiguous layers, and ink-producing material upon a wall of the passage so produced.

2. Means set forth generally in claim 1 hereof wherein the sinuous passage assumes a spiral form.

3. Means set forth generally in claim 1 hereof wherein the body takes the form of a sheet provided with spacing ribs and spirally disposed so as to leave a percolating space between said ribs.

In testimony whereof I affix my signature.

BYRON B. GOLDSMITH.